United States Patent [19]
Greisz

[11] Patent Number: 5,999,252
[45] Date of Patent: Dec. 7, 1999

[54] METHOD FOR MARKING WORKPIECES

[75] Inventor: Mark J. Greisz, Vancouver, Wash.

[73] Assignee: SEH America, Inc., Vancouver, Wash.

[21] Appl. No.: 09/120,981

[22] Filed: Jul. 22, 1998

[51] Int. Cl.⁶ .................................................. G01B 11/26
[52] U.S. Cl. .......................... 356/138; 356/143; 356/144; 356/146; 356/401
[58] Field of Search ................................ 356/388, 138, 356/401, 396, 143, 144, 146

[56] References Cited

U.S. PATENT DOCUMENTS

| | | | |
|---|---|---|---|
| 4,707,711 | 11/1987 | Hunter | 346/108 |
| 4,889,425 | 12/1989 | Edwards et al. | 356/152 |
| 4,958,794 | 9/1990 | Brewer | 248/183 |
| 5,005,177 | 4/1991 | Beckwith | 372/34 |
| 5,340,962 | 8/1994 | Schmidt et al. | 219/121.78 |
| 5,341,183 | 8/1994 | Dorsey et al. | 353/122 |
| 5,400,132 | 3/1995 | Trepagnier | 356/138 |
| 5,444,505 | 8/1995 | Dorsey et al. | 353/28 |
| 5,450,174 | 9/1995 | Dorsey et al. | 353/28 |
| 5,521,374 | 5/1996 | Cray et al. | 250/216 |
| 5,651,600 | 7/1997 | Dorsey et al. | 353/122 |
| 5,654,800 | 8/1997 | Svetkoff et al. | 356/376 |
| 5,742,385 | 4/1998 | Champa | 356/141.4 |

Primary Examiner—Robert H. Kim
Assistant Examiner—Reginald A. Ratliff
Attorney, Agent, or Firm—Marger Johnson & McCollom, P.C.

[57] ABSTRACT

A method for laser marking semiconductor wafers wherein marking errors attributable to the laser marking tool are measured for each of the anticipated marking fields. A weighted average error is then calculated, and a correction based thereon is entered into the control mechanism of the laser marking tool. The method of the invention reduces downtime between jobs by eliminating the need to recalibrate the laser marking tool between jobs.

8 Claims, 3 Drawing Sheets

| X Coord. | Y Coord. | X Dev. | Y Dev. | Weight | X Result |
|---:|---:|---:|---:|---:|---:|
| -20 | 5 | 0.115 | -0.018 | 1 | 0.115 |
| -10 | 5 | 0.091 | -0.057 | 4 | 0.364 |
| 0 | 5 | 0.066 | -0.066 | 4 | 0.264 |
| 10 | 5 | 0.047 | -0.056 | 4 | 0.188 |
| 20 | 5 | 0.02 | -0.02 | 1 | 0.02 |
| -30 | 10 | 0.239 | 0.024 | 2 | 0.478 |
| -20 | 10 | 0.175 | -0.03 | 2 | 0.35 |
| -10 | 10 | 0.135 | -0.059 | 2 | 0.27 |
| 0 | 10 | 0.072 | -0.059 | 2 | 0.144 |
| 10 | 10 | 0.032 | -0.059 | 2 | 0.064 |
| 20 | 10 | -0.014 | -0.017 | 2 | -0.028 |
| 30 | 10 | -0.06 | 0.035 | 2 | 0.12 |
| -30 | 20 | 0.358 | -0.028 | 1 | 0.358 |
| -20 | 20 | 0.265 | -0.055 | 1 | 0.265 |
| -10 | 20 | 0.189 | -0.069 | 1 | 0.189 |
| 0 | 20 | 0.054 | -0.069 | 1 | 0.054 |
| 10 | 20 | -0.025 | -0.054 | 1 | -0.025 |
| 20 | 20 | -0.113 | -0.017 | 1 | -0.113 |
| 30 | 20 | -0.118 | 0.04 | 1 | -0.118 |
| -20 | 30 | 0.274 | -0.116 | 1 | 0.274 |
| -10 | 30 | 0.167 | -0.112 | 1 | 0.187 |
| 0 | 30 | 0.039 | -0.09 | 3 | 0.117 |
| 10 | 30 | -0.044 | -0.059 | 1 | -0.044 |
| 20 | 30 | -0.175 | -0.021 | 3 | -0.525 |
| 30 | 30 | -0.282 | 0.032 | 1 | -0.282 |
| -10 | 40 | 0.153 | -0.159 | 1 | 0.153 |
| 0 | 40 | 0.021 | -0.126 | 3 | 0.063 |
| 10 | 40 | -0.106 | -0.085 | 3 | -0.318 |
| 20 | 40 | -0.242 | -0.044 | 4 | -0.968 |
| 30 | 40 | -0.37 | 0.001 | 4 | -1.48 |
| 0 | 50 | -0.043 | -0.155 | 1 | -0.043 |
| 10 | 50 | -0.124 | -0.03 | 1 | -0.124 |
| 20 | 50 | -0.268 | 0.003 | 3 | -0.804 |
| 30 | 50 | -0.408 | 0.053 | 3 | -1.224 |
| 0 | 60 | -0.078 | -0.0119 | 1 | -0.078 |
| 10 | 60 | -0.202 | -0.045 | 1 | -0.202 |
| 20 | 60 | -0.348 | -0.007 | 1 | -0.348 |
| 30 | 60 | -0.496 | 0.036 | 1 | -0.496 |
|  |  |  |  | 72 | -3.443 |

| | |
|---|---:|
| "X" Axis Offset Error | -0.04781944 |
| "Y" Axis Offset Error | -0.04222222 |
| Horizontal Command Range Weighted Error | 0.568442105 |
| Vertical Command Range Weighted Error | -0.05123742 |

| | |
|---|---:|
| Suggested Horiz. CMD RNG adjustment (+=cw,-=ccw)- | -0.76739684 |
| Suggested Vert. CMD RNG adjustment------- | 0.069170517 |

| Y Result | | | | |
|---|---|---|---|---|
| −0.018 | | | Weight | |
| −0.228 | | | | |
| −0.264 | Horiz 5 cmd. mg | 0.095 | | 4 |
| −0.224 | | | | |
| −0.02 | | | | |
| 0.048 | | | | |
| −0.06 | | | | |
| −0.118 | | | | |
| −0.118 | Horiz 10 cmd. mg | 0.195 | | 3 |
| −0.118 | | | | |
| −0.034 | | | | |
| 0.07 | | | | |
| −0.028 | | | | |
| −0.055 | | | | |
| −0.069 | | | | |
| −0.069 | Horiz 20 cr | 0.307 | | 1 |
| −0.054 | | | | |
| −0.017 | | | | |
| 0.04 | | | | |
| −0.116 | | | | |
| −0.112 | | | | |
| −0.27 | | | | |
| −0.059 | Horiz 30 cr | 0.449 | | 3 |
| −0.063 | | | | |
| 0.032 | | | | |
| −0.159 | | | | |
| −0.378 | | | | |
| −0.255 | Horiz 40 cr | 0.523 | | 4 |
| −0.176 | | | | |
| 0.004 | | | | |
| −0.155 | | | | |
| −0.03 | Horiz 50 cr | 0.568 | | 3 |
| .0.009 | | | | |
| 0.159 | | | | |
| −0.119 | | | | |
| −0.045 | Horiz 60 cr | 0.588 | | 1 |
| −0.007 | | | | 19 |
| 0.036 | | | | |
| −3.04 | | | | |

FROM FIG.2A

| Vert. Cmd. Rng. | | Weight | |
|---|---|---|---|
| Vert −30 cr | −0.286 | 1 | −0.286 |
| Vert −20 cr | −0.2156 | 2 | −0.4312 |
| Vert −10 cr | −0.1602828 | 3 | −0.4808484 |
| Vert 0 cr | −0.053 | 4 | −0.212 |
| Vert 10 cr | 0.011 | 4 | 0.044 |
| Vert 20 cr | 0.013 | 4 | 0.052 |
| Vert 30 cr | 0.0011 | 3 | 0.0033 |
| | | 20 | −0.05123742 |

FIG.2B

METHOD FOR MARKING WORKPIECES

The present invention relates to the marking of workpieces, and in particular to a precise alignment laser marking method for use in marking semiconductor wafers.

In the manufacture of semiconductor wafers for use in the manufacture of chips, a fabricator of such wafers is normally required by the customer to mark the wafer with proprietary information in a precisely-located field using some or all of 47 characters. The location of the marking field is specified by the customer, and therefore varies from customer to customer. A wafer fabricator must, as part of its fabrication services, precisely place the customer-specified markings in the specified location as part of meeting the customer's wafer specification.

Laser marking of wafers is achieved by use of specialized laser marking equipment such as the Lasermark Sigma DSC manufactured by Lumonics, Inc., of Ottawa, Canada. In general, laser marking equipment includes a support for positioning the wafer, a laser beam, and a mechanism for precisely positioning the laser for marking the wafer in the required locations. One such apparatus and method of automatically controlling a laser marking tool is described in U.S. Pat. No. 5,340,962 to Schmidt et al. The positioning of the laser relative to the wafer is generally achieved by defining a fixed reference point peripheral to the wafer, and by defining X and Y axes referenced to the reference point. In normal practice, the required locations for marking the wafer are inputted to the laser marking equipment as X and Y coordinates which are referenced to the reference point. The laser marking machine then marks the wafer at locations corresponding to nominal X and Y coordinates and the reference point. Laser marking equipment has inherent limitations in marking precision, however. In one aspect, the laser marking equipment precision varies from location to location on the wafer. As a result, laser marking equipment which has been calibrated to provide precise marking at one location on the wafer will often not provide precise marking at a different location on a wafer. For example, a given machine might provide acceptable precision at a first location on a wafer, but be out of specification on another region of the same wafer. This variability is particularly significant when marking wafers of different diameters as the error increases proportionally to the distance from the reference mark. In order to assure the correct marking of the wafer when changing field locations on a single wafer size, or when marking wafers of different diameters, the laser marking equipment must be taken off line and recalibrated for each new marking job. This results in significant down time, and represents a significant productivity loss for a wafer fabricator.

As a result, a need exists for a method of calibrating laser marking equipment which alleviates the need to recalibrate for each wafer marking task.

SUMMARY OF THE INVENTION

It is therefore an object of the invention to provide a method for calibrating laser marking equipment which eliminates the need to recalibrate for each marking job.

It is also an object of the invention to provide a method for calibrating laser marking equipment which enables a wafer fabricator to perform a single calibration which provides the required marking precision for all the specified marking fields and characters of different customers.

BRIEF DESCRIPTION OF THE FIGURES

FIG. 2 is a typical spreadsheet showing the measured marking errors and their use in calculating the weighted average correction factors according to the methods of the invention.

DETAILED DESCRIPTION

Figure 1:
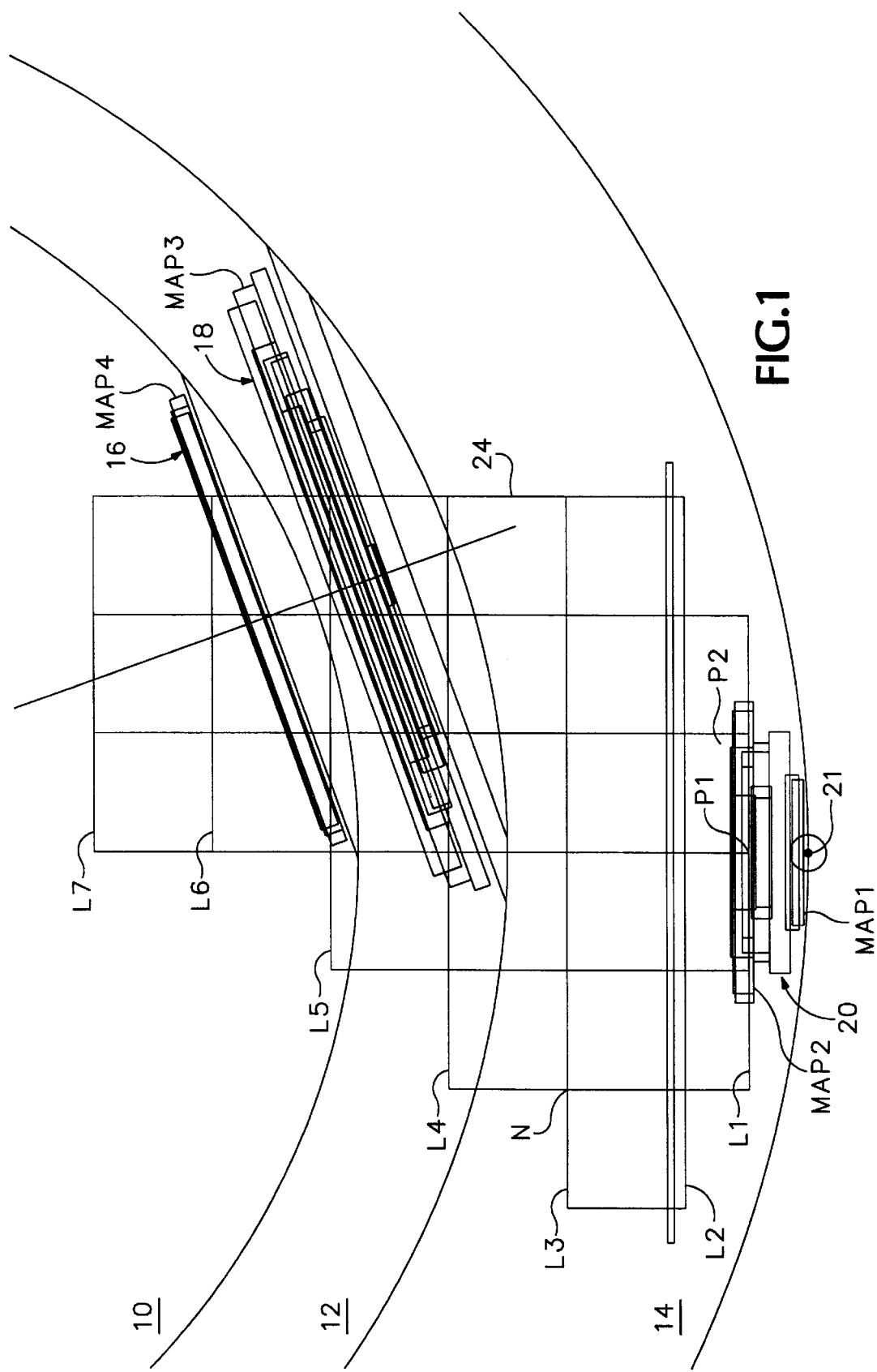
FIG. 1 is a schematic representation of a wafer showing the marked grids according to the invention.

FIG. 1 is a schematic representation of wafers 10, 12 and 14, which are of 125 mm, 150 mm, and 200 mm diameters respectively. A plurality of typical marking fields 16, 18 and 20 are shown on wafers 10, 12 and 14 respectively. Marking fields 16, 18 and 20 are representative of typical multiple field locations encountered. A reference point on the laser marking equipment(not shown) defines a common reference point 21 for marking each of the different sized wafers. According to the preferred embodiment, the laser marking tool (not shown) is a Lumonics Lasermark Sigma DSC, although the invention is not intended to be limited to a particular laser marking machine. In general, the Lumonics DSC includes a laser that is selectively directed to predetermined locations by being reflected onto the surface by one or more adjustable mirrors. The position of the mirrors is controlled by galvanometers (galvos). Adjustments to the galvo settings are made by corresponding entries in one of several files in the software which controls the Lumonics DSC, and through the adjustment of gain potentiometers on each galvo axis control board.

The galvo settings are initially set in the control software "STARTUP" file wherein line "OFFSET[8]N.X=" is set to 0±5 mm, line "OFFSET[8]N.Y=" is set to −30±5 mm, and line "ALIGNER_OFFSET_TOP[N]=" is set to 180±3. Then, with the laser on and the galvos idle, the galvo mirrors are adjusted to place the laser at the center of a flat of a stationary (i.e. non-rotating) 150 mm wafer. A job file is opened as 8"TEST", and entries made therein specifying points to be marked at XO Y5, XO Y15, X-25 Y5, and X25 Y5 (P1–P4). Points P1–P4 are then marked on a 200 mm wafer to determine "rough" galvo and gain settings. The first determination made in the preferred method is the "tilt", if any, of grid 24. The tilt is determined by selecting two points such as P3 and P4 (not shown) which have the same nominal "Y" coordinate, and which define a nominal horizontal line L1 therethrough. The orientation of the line L1 relative to a "true" horizontal line is determined by visual inspection using a Nikon optical comparitor. If line L1 is determined to be rotated out of horizontal, the rotational error is corrected by changing the value assigned to the "ALIGNER_ OFFSET_TOP[N]=" line in the STARTUP file until the line L1 is within 1° of horizontal. STARTUP file lines "OFFSET [8]N.X=" and "OFFSET[8]N.Y=" are assigned values to bring the X and Y offset errors to less than 1 mm. The "rough" gain correction is determined next. In the preferred method, grid 24 is set at 5 mm increments, i.e. points P1–Pn are located 5 mm apart along the X and Y axes. To determine the required "rough" gain adjustment, grid 24 is reprofiled to determine the variation, if any, between the nominal 5 mm grid spacing and the grid spacing as actually marked by the Lumonics DCS. The actual spacing of the grid as marked is determined using the optical comparitor to measure the nominal 50 mm distance along the X-axis between P3 (−25,5) and P4 (+25,5). Rough gain corrections are made by adjusting the "CMD RNG" potentiometer on the "X" axis galvo board to reduce the "X" axis error to less than 50 microns. A rough gain correction is made to the Y-axis by measuring the nominal 10 mm distance between P1 (0,5) and P2 (0,15). Rough gain corrections are made by adjusting the "CMD RNG" potentiometer on the "Y" axis galvo board to reduce the "Y" axis error to less than 50 microns.

Next, the aligner repeatability error is determined to define the average errors in precision of the aligner. Points P1–P4 (XO Y5, XO Y15, X-25 Y5, and X25 Y5) are marked 8 times and measured using the optical comparitor. An average rotational error is calculated and put into "ALIGNER_OFFSET_TOP[N]=" file. Average "X" and "Y" offset errors are calculated and entered into the respective "OFFSET[8]N.X=" and "OFFSET[8]N.Y=" files.

As mentioned above, each customer of a wafer fabricator specifies a size and location for the information fields applied their respective wafers. The information fields of different customers normally differ in size and location on the wafer. In one preferred method, the corner coordinates of four such "maps", MAP1–MAP4, are loaded into a job queue, and marked on a single wafer. The locations of MAP1–MAP4, as marked, are measured and entered into MAP.WK4, "X Data" and "Y Data". (FIG. 3). The methods of the present invention utilize a calculational scheme that recognizes that a) the accuracy of the laser marking tool varies from area to area on the wafer surface, and b) that the accuracy can vary in areas separated by just a 5–10 mm. Applicant has utilized these facts to recognize for the first time that according to the methods of the invention, one can calculate and program into the laser marking tool "X" and "Y" correction factors that take into account the differing frequencies of marking on different areas on the wafer. Specifically, weighted average "X" and "Y" correction factors are calculated by taking into account the frequency with which the required fields MAP1–MAP4 fall within a specific area on the wafer. The measured error of the field locations in the specific areas of the wafer are then weighted accordingly in calculating "X" and "Y" correction factors which will eliminate or minimize "out of spec" field locations on the wafer. Referring also to FIG. 2, the correction factors for MAP1–MAP4 are calculated as follows.

The laser system has a projection area that is partially represented by the test grid area 24 in FIG. 1. The test grid area is limited by the measurement equipment available, or the projection area of the laser, which ever is greater. Four test grid areas are utilized because the process needs thirty eight marks on the wafer for proper utilization of the of available test equipment, and the Lumonics programming limits the number of mark coordinates within a job to be no more than twelve per area.

The first test grid marks the wafer at each node along the rows L1 and L2 with an "L". All characters marked are dot matrix characters formed in a 5×9 matrix pattern. The system references the beginning of each mark to be the position of the bottom left dot position in the matrix of the first character. The second test grid marks the wafer along the next couple rows and also marks a "V" at location X=0, Y=5. The "V" is marked over the "L" at X=0, Y=5 for reasons explained below. The third test grid marks the wafer along the next couple rows and marks location X=0, Y=5, with a "C" instead of an "L". The fourth test grid marks the wafer along the next couple rows and marks location X=0 and Y=5, with a "T" instead of an "L". The overlaying of characters "L", "V", "C" and "T" at X=0, Y=5 is done to verify that the wafer position has not shifted between the marking of the different jobs, and is similar to register marks used in multicolor printing processes. In this way, any error detected can then be correlated to the proper test grid set.

When all the necessary jobs have been run, the desired mark area will have a grid represented on the wafer by the marked "L" characters with the bottom left corner of each "L" representing the grid line intersections. For each subsequent job after the first, there will be a different register mark at the coordinate X=0, Y=5. The actual locations of the marks are then determined using a NIKON profiler, or other suitable means. The deviations between the specified locations and the marked locations for each individual mark are then calculated for both the X and Y directions. As shown in FIG. 2, the deviations for each mark are than multiplied by a weighting factor of between 1 and 4. The weighting factor is calculated as follows. All of the customers' mark field coordinates are entered into a computer aided drafting (CAD) program. The CAD program calculates the occurrences of the mark fields within the range of each grid intersection, and assigns a "weight" to each mark as follows. If only one mark is within 5 mm of a grid intersection, the assigned weight is 1. If from 2 to 5 marks are within 5 mm of a particular grid intersection, the assigned weight is 2. If 6–10 marks are within 5 mm of the grid intersection, the assigned weight is 3. If eleven or more marks are within 5 mm of the grid intersection, the assigned weight is 4. After the appropriate weighting factor has been assigned to each mark deviation for each of the "X" and "Y" directions, the average deviation for each of the "X" and "Y" directions is calculated. The respective weighted average deviations for the "X" and "Y" directions are then entered into the startup file as "OFFSET[6]N.X=" and "OFFSET[6]N.Y=". Applicant has found that use of the claimed method improves productivity by reducing time spent recalibrating the laser marking tool between jobs, while at the same time reducing the occurrence of misplaced marking fields.

Although the invention has been described with reference to the foregoing preferred embodiments, those skilled in the art will recognize that the methods could be modified without departing from the scope and spirit of the following claims.

I claim:

1. A method for marking a workpiece comprising the steps of:

providing a workpiece;

defining a plurality of desired fields on the workpiece;

providing an apparatus for marking the workpiece at a marking location responsive to an input location;

defining a reference point proximate the workpiece;

inputting to the marking apparatus a plurality of input locations;

marking the workpiece at a plurality of marking locations corresponding to the respective plurality of input locations;

determining a first angle of a first line through first and second of said marked locations relative to a second line through corresponding first and second input locations;

inputting into the marking apparatus a correction factor corresponding to the first angle;

determining a first difference between the distance from the reference point to a third marking location relative to a nominal distance between the reference point and the third input location;

inputting into the marking apparatus a first gain correction factor corresponding to the first difference;

measuring an offset for each marked location relative to its corresponding input location;

inputting to the marking apparatus an offset correction, the correction being a composite correction derived from the offsets of each said marking location relative to its corresponding input location.

2. The method of claim 1 wherein the plurality of input locations and the plurality of marking locations are defined relative to the reference point, and to first and second perpendicular axes passing through the reference point.

3. The method of claim 2 wherein the plurality of input locations comprise a grid.

4. The method of claim 1 wherein the step of measuring the offset of each marking location relative to its corresponding input location comprises the steps of:

inputting two points defining a first nominally horizontal line;

marking the two points on the workpiece to define a first marked line;

measuring the tilt of the first marked line; and wherein the step of inputting to the marking apparatus a marking location correction includes inputting a rotational correction based on the measured tilt of the first marked line.

5. The method of claim 1 wherein the step of measuring the offset of each marking location relative to its corresponding input location comprises the steps of:

inputting two marking locations which are spaced apart by a nominal distance;

marking first and second points at each of said two marking locations;

measuring the actual distance between the two marking locations;

calculating a gain correction factor based on the difference between the nominal and actual distances; and wherein the step of inputting to the marking apparatus a marking location correction includes inputting the gain correction factor.

6. The method of claim 1 wherein the step of measuring the offset of each marking location relative to its corresponding input location comprises the steps of:

inputting predetermined field-marking locations defining a plurality of fields on the workpiece;

marking the plurality of predetermined fields on the workpiece;

measuring deviations between the input marking locations and the actual field locations;

calculating an average deviation between the input marking locations and the corresponding respective field locations; and, inputting a correction factor based on the calculated average deviation.

7. The method of claim 6 wherein the average comprises a weighted average.

8. The method of claim 7 wherein the weighted average is derived by determining the number of input marking locations which fall within a specified distance of a predetermined location on the workpiece, and assigning a weighting factor based thereon to each measured deviation.

* * * * *